US008450628B2

(12) United States Patent
Yau et al.

(10) Patent No.: US 8,450,628 B2
(45) Date of Patent: May 28, 2013

(54) PROJECTIVE CAPACITIVE TOUCH SENSOR STRUCTURE AND FABRICATING METHOD THEREOF

(75) Inventors: Bao-Shun Yau, Kaohsiung (TW); Mike Lu, New Taipei (TW); Chung-Huang Huang, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 183 days.

(21) Appl. No.: 13/175,897

(22) Filed: Jul. 4, 2011

(65) Prior Publication Data
US 2012/0193210 A1    Aug. 2, 2012

(30) Foreign Application Priority Data

Feb. 1, 2011 (TW) .............................. 100103987 A
Jun. 9, 2011 (TW) .............................. 100120192 A

(51) Int. Cl.
*H03K 17/975* (2006.01)
(52) U.S. Cl.
USPC ....................................................... 200/600
(58) Field of Classification Search
USPC ............... 345/173, 174, 177, 178; 178/18.01, 178/18.03, 18.05, 18.07; 463/37–38; 200/600, 200/5 R, 46, 506, 512, 514; 29/846–847
See application file for complete search history.

(56) References Cited

U.S. PATENT DOCUMENTS

| 4,852,443 | A  | * | 8/1989  | Duncan et al. .................. 84/733 |
| 6,809,280 | B2 | * | 10/2004 | Divigalpitiya et al. ....... 200/512 |
| 7,989,725 | B2 | * | 8/2011  | Boddie et al. ................. 200/600 |
| 8,153,920 | B2 | * | 4/2012  | Yau et al. ....................... 200/512 |
| 2006/0202970 | A1 |  | 9/2006  | Lii et al. |
| 2011/0290631 | A1 | * | 12/2011 | Kuriki ........................... 200/600 |

FOREIGN PATENT DOCUMENTS

| TW | M354119  | 4/2009  |
| TW | M370134  | 12/2009 |
| TW | M375934  | 3/2010  |
| TW | M378432  | 4/2010  |
| TW | M380535  | 5/2010  |
| TW | 201020893 | 6/2010 |
| TW | M387317  | 8/2010  |

OTHER PUBLICATIONS

Chris Brown et al., "In-Cell Capacitance Touch-Panel with Improved Sensitivity", SID 10 DIGEST, May 2010, pp. 346-349.
Kung et al., "Ultra-Thin High-Transparency Projective Capacitive Touch Sensing Film", SID 10 DIGEST, May 2010, pp. 449-452.
Hwang et al., "On-cell Projected Capacitive Type Touch Sensor for NBPC", SID 10 DIGEST, May 2010, pp. 677-679.

* cited by examiner

*Primary Examiner* — Edwin A. Leon
(74) *Attorney, Agent, or Firm* — Jianq Chyun IP Office

(57) ABSTRACT

A projective capacitive touch sensor structure includes following elements. Two second transparent patterned electrodes are disposed on a substrate and located at two sides of a first transparent patterned electrode. A bridging wire strides over the first transparent patterned electrode and electrically bridges the second transparent patterned electrodes to form a conducting wire. A transparent dielectric pad is disposed between the bridging wire and the first transparent patterned electrode. A dielectric portion of the transparent dielectric pad located above the first transparent patterned electrode and the second transparent patterned electrodes includes an upper surface, a lower surface and an inclined side surface connecting the upper surface and the lower surface, an area of the upper surface is 70%-95% of an area of the lower surface, and an included angle between the inclined side surface and the lower surface is an acute angle.

26 Claims, 3 Drawing Sheets

PROJECTIVE CAPACITIVE TOUCH SENSOR STRUCTURE AND FABRICATING METHOD THEREOF

CROSS-REFERENCE TO RELATED APPLICATION

This application claims the priority benefit of Taiwan application serial no. 100103987, filed on Feb. 1, 2011 and Taiwan application serial no. 100120192, filed on Jun. 9, 2011. The entirety of each of the above-mentioned patent applications is hereby incorporated by reference herein and made a part of this specification.

BACKGROUND OF THE DISCLOSURE

1. Technical Field

The disclosure relates to a touch sensor structure and fabricating method thereof, and more particularly to a projective capacitive touch sensor structure and fabricating method thereof.

2. Background

The trend of display technology development gradually heads toward man-machine interface with more humanity. The conventional input interface were mostly operated with mechanical buttons. However, as the rise of flat displays, touch panels have now become the main stream in the market by replacing input devices such as keyboards, mice, and so on, such that various information apparatuses are more used friendly. Thus, the timing of touch panels for input interface has come. For example, these touch panels can be adopted in automobile navigation, game consoles, public information systems (e.g. vending machines, automatic teller machines (ATMs), tour guide systems, industrial use, small electronic products (e.g. personal digital assistants (PDAs), e-books and so on. The touch panel industry is highly competitive, and the manufacturers are mainly in Japan, Taiwan, the United States of America, Korea, and China. Manufactures in the world are actively involved in this touch field and the market demand for touch panels is expected to increase tremendously in the next few years.

With the overwhelming popularity of iPhone, the global sale of smart phones has increased rapidly. Manufacturers do not dare to underestimate the market potential of smart phones in hardware apparatuses and application services and have prepared themselves to take the market share. Projective capacitive touch panels thus develop in an explosive manner and more manufacturers specialized in touch panels have themselves involved in the development and production of multi-touch technology.

Conventional projective capacitive touch panels are constituted by a dual-substrate structure, where the X and Y sensor units are respectively disposed on two different surface of substrates. The dual-substrate structure may lead to misalignment. The misalignment leads to insensitive touch signals and lower precision. Further, other than the massive structure of the double-layer structure, as the X and the Y axis sensor units on the different planes have a higher hollow ratio, non-uniform light transmittance results in a visible range which leads to image distortion.

In order to solve the issues derived from the projective capacitive touch panel having the dual-substrate structure, the projective capacitive touch panel now applies the structural design of a projective capacitive touch panel having a single substrate. In the projective capacitive touch panel having the single substrate structure, an X and a Y axis sensor units are disposed on the same plane respectively to greatly reduce the hollow ratio and the problem of the vertical alignment, such that better images, higher sensitivity and precision can be obtained. Furthermore, the design of the single substrate also leads to weight reduction and miniaturization.

The fabricating process of the conventional projective capacitive touch panel having the single substrate structure is very complicated as follows. A patterning process of the X and the Y axis sensor units on the same plane is performed on a transparent conductive substrate. A dielectric insulating layer is deposited on the X and the Y axis sensor units by using a vacuum deposition method, and then a structure required by a bridging wire is formed by performing a photolithography process and a etching process to the dielectric insulating layer. A metal layer is deposited on the dielectric insulating layer structure by using a vacuum deposition method, and then the bridging wire is formed by performing a photolithography process and a etching process to the metal layer. As mentioned above, serial and complicated vacuum deposition processes, photolithography processes and etching processes are required in the conventional process. Therefore, the disclosure provides a projective capacitive touch panel having the single substrate structure which can simplify the process.

SUMMARY OF THE DISCLOSURE

A projective capacitive touch sensor structure eliminated image sticking and bright dots in a visible region of a touch sensor is introduced in an exemplary embodiment of the disclosure.

A simple method of fabricating a projective capacitive touch sensor structure is introduced in an exemplary embodiment of the disclosure.

A projective capacitive touch sensor structure including a substrate, a first transparent patterned electrode, two second transparent patterned electrodes, a bridging wire, and a transparent dielectric pad is introduced in an exemplary embodiment of the disclosure. The first transparent patterned electrode is disposed on the substrate. The two second transparent patterned electrodes are disposed on the substrate and located at two sides of the first transparent patterned electrode. The bridging wire strides over the first transparent patterned electrode and electrically bridges the second transparent patterned electrodes located at the two sides of the first transparent patterned electrode to form a conducting wire. The transparent dielectric pad is disposed between the bridging wire and the first transparent patterned electrode. Herein, a dielectric portion of the transparent dielectric pad located above the first transparent patterned electrode and the second transparent patterned electrodes includes an upper surface, a lower surface, and an inclined side surface connecting the upper surface and the lower surface. An area of the upper surface is 70% to 95% of an area of the lower surface, and an included angle between the inclined side surface and the lower surface is an acute angle.

A method of fabricating a projective capacitive touch sensor structure is introduced in an exemplary embodiment of the disclosure. The method includes the following steps. A substrate is provided. A first transparent patterned electrode and two second transparent patterned electrodes are formed on the substrate. The second transparent patterned electrodes are disposed at two sides of the first transparent patterned electrode. A transparent dielectric pad is printed on the first transparent patterned electrode and the second transparent patterned electrodes. Herein, a dielectric portion of the transparent dielectric pad located above the first transparent patterned electrode and the second transparent patterned electrodes includes an upper surface, a lower surface, and an inclined side surface connecting the upper surface and the lower surface. An area of the upper surface is 70% to 95% of an area of the lower surface, and an included angle between the inclined side surface and the lower surface is an acute angle. A bridging wire is formed on the transparent dielectric pad. The bridging wire strides over the first transparent patterned electrode and electrically bridges the second transparent patterned electrodes located at the two sides of the first transparent patterned electrode to form a conducting wire.

In light of the foregoing, in the projective capacitive touch sensor structure introduced herein, as the area of the upper surface of the dielectric portion is 70% to 95% of that of the lower surface, and the included angle between the inclined side surface and the lower surface is an acute angle, the generation of image sticking and bright dots is prevented in the visible region of the touch sensor.

Also, in the method of fabricating the projective capacitive touch sensor structure introduced herein, since the transparent dielectric pad is formed by printing, the fabrication process is simplified greatly so as to shorten production time and increase production.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
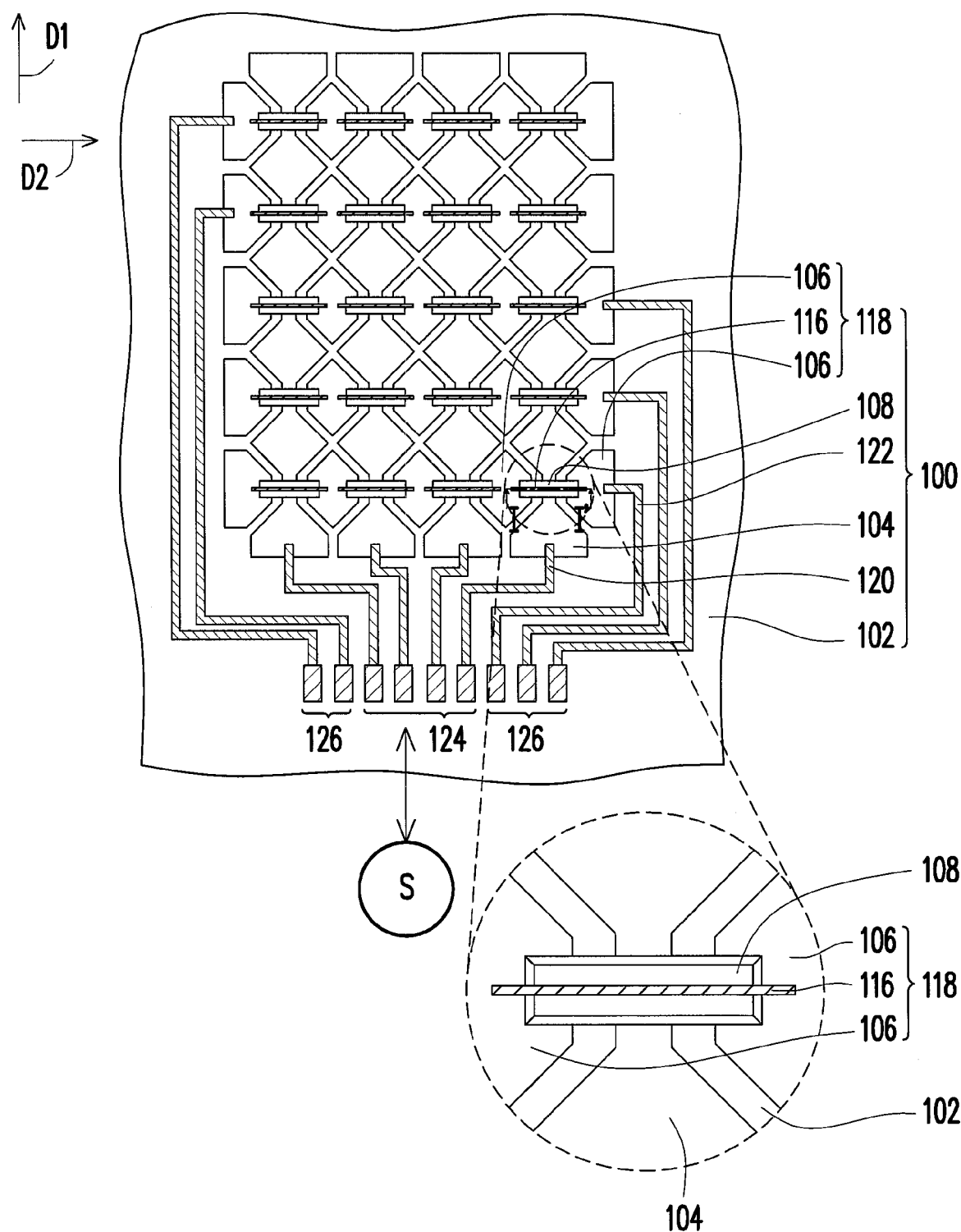
FIG. 1 is a schematic diagram illustrating a top view of a projective capacitive touch sensor structure according to an exemplary embodiment of the disclosure.
Figure 2A:
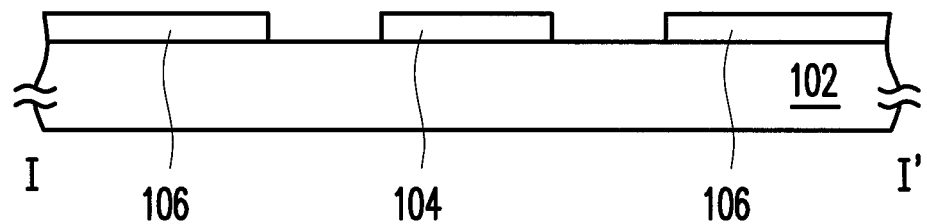
FIGS. 2A to 2B are schematic cross-sectional diagrams illustrating a fabrication flow chart taken along a line I-I' in FIG. 1.
Figure 2B:
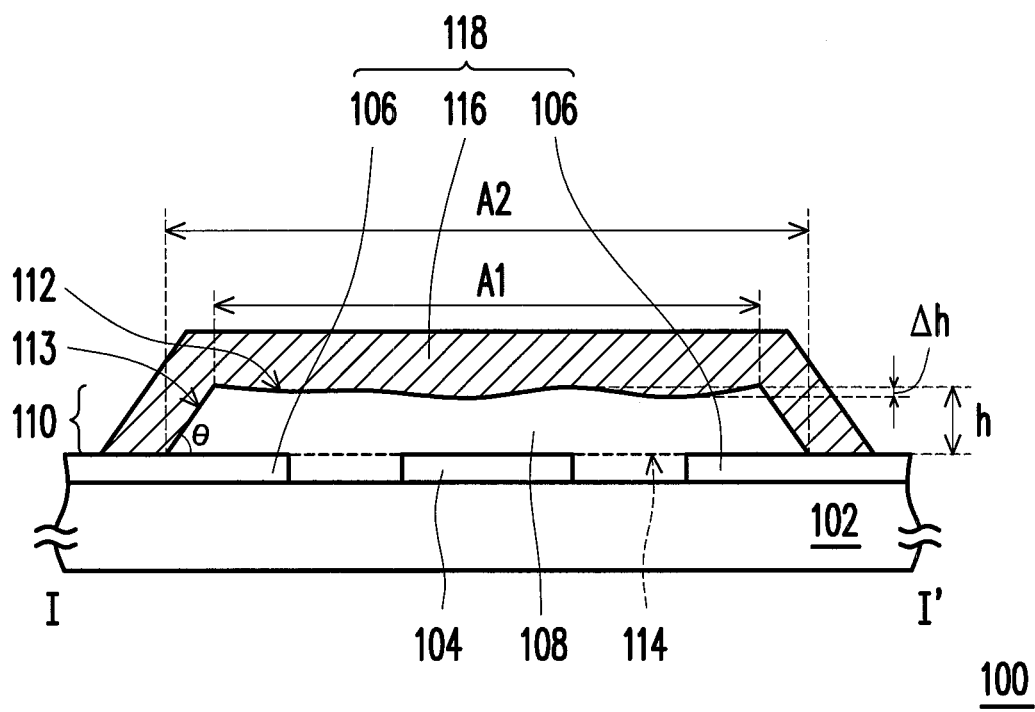

FIG. 1 is a schematic diagram illustrating a top view of a projective capacitive touch sensor structure according to an exemplary embodiment of the disclosure. FIGS. 2A to 2B are schematic cross-sectional diagrams illustrating a fabrication flow chart taken along a line I-I' in FIG. 1. FIGS. 2A and 2B are illustrated by using a formation of a sensor unit 100 as an example.

Referring to FIG. 1 and FIG. 2A simultaneously, a substrate 102 is first provided. The substrate 102 is, for example, a flexible substrate or a rigid substrate. Here, a material of the flexible substrate is polyethylene terephthalate, polycarbonate, or a flexible glass, for instance. The rigid substrate is a rigid glass.

Next, a first transparent patterned electrode 104 and two second transparent patterned electrodes 106 are formed on the substrate 102. The second transparent patterned electrodes 106 are disposed at two sides of the first transparent patterned electrode 104. A material of the first transparent patterned electrode 104 is a transparent conductive oxide, an organic transparent conductive material, a nano metal, or a carbon nanotube, for example. A material of the second transparent patterned electrode 106 is a transparent conductive oxide, an organic transparent conductive material, a nano metal, or a carbon nanotube, for example. Here, the transparent conductive oxide is, for example, indium tin oxide (ITO) or indium zinc oxide (IZO), and the organic transparent conductive material is, for example, poly(3,4-ethylenedioxythiophene):poly(styrenesulfonate) (PEDOT:PPS). In addition, the first transparent patterned electrode 104 is a single layer structure or a multi-layer structure. The second transparent patterned electrode 106 is a single layer structure or a multi-layer structure. When the first transparent patterned electrode 104 and/or the second transparent patterned electrode 106 are multi-layer structures, the multi-layer structures of the first transparent patterned electrode 104 and/or the second transparent patterned electrode 106 are each a stacked combination of a transparent metal oxide layer and a metal layer, for example. The stacked combination can have a stacked combination of transparent metal oxide layer/metal layer/transparent metal oxide layer, such as ITO/Ag/ITO or IZO/Ag/IZO. A method of forming the first transparent patterned electrode 104 and the second transparent patterned electrodes 106 includes performing a deposition process, a photolithography process, and an etching process, for instance.

Next, referring to FIGS. 1 and 2B simultaneously, a transparent dielectric pad 108 is printed on the first transparent patterned electrode 104 and the second transparent patterned electrodes 106. In the present exemplary embodiment, the transparent dielectric pad 108 exposes a portion of the second transparent patterned electrodes 106, for example, and is printed on a portion of the substrate 102 between the first transparent patterned electrode 104 and the second transparent patterned electrodes 106. A material of the transparent dielectric pad 108 is a dielectric material such as resin, for instance, and is a photo-sensitive resin or a thermo-setting resin. A light transmittance of the transparent dielectric pad 108 is higher than 90%, for instance. A refractive coefficient of the transparent dielectric pad 108 ranges from 1 to 2, for example. A printing method of the transparent dielectric pad 108 is, for example, a screen printing method or a transfer printing method.

A dielectric portion 110 of the transparent dielectric pad 108 located above the first transparent patterned electrode 104 and the second transparent patterned electrodes 106 includes an upper surface 112, a lower surface 114, and an inclined side surface 113 connecting the upper surface 112 and the lower surface 114. An area A1 of the upper surface 112 is 70% to 95% of an area A2 of the lower surface 114. An included angle θ between the inclined side surface 113 and the lower surface 114 is an acute angle. A height h of the dielectric portion 110 is lower than 30 μm, for example. A height deviation Δh of the upper surface 112 of the dielectric portion 110 is equal to or smaller than 10% of a height h of the dielectric portion 110. Here, the height h is defined as a distance from the first transparent patterned electrode 104 and the second transparent patterned electrodes 106 to a highest point of the upper surface 112 (as there is a 10% deviation). The height deviation Δh is defined as a height difference between a lowest point and the highest point of the upper surface 112.

Thereafter, a bridging wire 116 is formed on the transparent dielectric pad 108. The bridging wire 116 strides over the first transparent patterned electrode 104 and electrically bridges the second transparent patterned electrodes 106 located at the two sides of the first transparent patterned electrode 104 to form a conducting wire 118 by the bridging wire 116 and the second transparent patterned electrodes 106. That is, the transparent dielectric pad 108 is disposed between the bridging wire 116 and the first transparent patterned electrode 104 to electrically isolate the bridging wire 116 and the first transparent patterned electrode 104 so as to form an induction capacitor. A material of the bridging wire 116 includes, for example, a metal-containing material including a conductive silver paste, a copper-containing metal or a multiple layer material of molybdenum/aluminum/molybdenum (Mo/Al/Mo). A method of forming the bridging wire 116 is a gravure offset printing method or an ink jet printing method, for example. When the metal-containing material configured to form the bridging wire 116 is a copper-containing material, Mo/Al/Mo, or the like, the bridging wire 116 is formed by performing a deposition process, a photolithography process, and an etching process, for example.

Also, a first connecting wire 120 and a second connecting wire 122 are optionally formed on the substrate 102 (not shown in the cross-sectional diagram in FIG. 2B, please refer to FIG. 1). Herein, the first connecting wire 120 connects the first transparent patterned electrode 104 and has a first electrically connected terminal 124. The second connecting wire 122 connects the second transparent patterned electrode 106 located at one end of the conducting wire 118. The second connecting wire 122 has a second electrically connected terminal 126. The first connecting wire 120 and the second connecting wire 122 and other elements formed on the substrate 102 can be formed in any order and the disclosure is not limited to any specific formation order.

A material of the first connecting wire 120 includes, for example, a metal-containing material including a conductive silver paste, a copper-containing metal or a multiple layer material of Mo/Al/Mo. A material of the second connecting wire 122 includes, for example, a metal-containing material including a conductive silver paste, a copper-containing metal or a multiple layer material of Mo/Al/Mo. A method of forming the first connecting wire 120 and the second connecting wire 122 is, for example, a screen printing method, a transfer printing method, a gravure offset printing method, an ink jet printing method, or a photolithographic etching method. The first connecting wire 120 and the corresponding first electrically connected terminal 124 are, for example, formed as an integrative unit or individually. The second connecting wire 122 and the corresponding second electrically connected terminal 126 are, for example, formed as an integrative unit or individually.

The first electrically connected terminal 124 can transmit an external signal S to the first transparent patterned electrode 104 through the first connecting wire 120. The second electrically connected terminal 126 can transmit an external signal S to the second transparent patterned electrode 106 through the second connecting wire 122. Moreover, one of ordinary skill in the art can design and adjust the external signal S transmitted to the first transparent patterned electrode 104 and the second transparent patterned electrodes 106 respectively.

It should be noted that when the transparent dielectric pad 108, the bridging wire 116, the first connecting wire 120 and the second connecting wire 122 are formed by a printing process, a sheet-fed printing method or a roll-to-roll printing method is adopted, for instance.

In the above, the formation of one sensor unit 100 in the projective capacitive touch sensor structure is illustrated as an example; however, the disclosure is not limited thereto. In practice, the projective capacitive touch sensor structure can be assembled by one or multiple sensor units 100. One of ordinary skills in the art should understand the methods of fabricating different projective capacitive touch sensor structures by referring the content disclosed in the exemplary embodiments aforementioned.

For example, referring to FIG. 1, the projective capacitive touch sensor structure is formed by a plurality of sensor units 100. When forming a plurality of first transparent patterned electrodes 104, the first transparent patterned electrodes 104 extend along a first direction D1, for example, and are parallel to one another, for example. Additionally, a plurality of conducting wires 118 that is electrically isolated with the first transparent patterned electrodes 104 is formed by forming a plurality of second transparent patterned electrodes 106, a plurality of transparent dielectric pads 108, and a plurality of bridging wires 116, and the conducting wires 118 extend along a second direction D2. The conducting wires 118 are parallel to one another, for example and the second direction D2 intersects with the first direction D1, so that the conducting wires 118 and the first transparent patterned electrodes 104 form a matrix structure. By forming a plurality of first conducting wires 120 and a plurality of second conducting wires 122, the external signal S is then transmitted to the first transparent patterned electrodes 104 and the second transparent patterned electrodes 106 respectively through the first electrically connected terminal 124 on the first connecting wire 120 and the second electrically connected terminal 126 on the second connecting wire 122. However, the projective capacitive touch sensor structure disclosed in FIG. 1 is not used to limit the disclosure.

Accordingly, since the transparent dielectric pad 108 in the projective capacitive touch sensor structure is formed by printing, the transparent dielectric pad 108 can be fabricated rapidly so as to simplify the fabrication greatly, thereby reducing the production time and increasing the production.

The projective capacitive touch sensor structure in the above exemplary embodiment is described using FIG. 1 and FIG. 2B in the following.

Referring to FIGS. 1 and 2B simultaneously, firstly, the projective capacitive touch sensor structure here merely includes one sensor unit 100 as an example for illustration. The projective capacitive touch sensor structure includes the substrate 102, the first transparent patterned electrode 104, two second transparent patterned electrodes 106, the transparent dielectric pad 108, and the bridging wire 116. The first transparent patterned electrode 104 is disposed on the substrate 102. The two second transparent patterned electrodes 106 are disposed on the substrate 102 and located at two sides of the first transparent patterned electrode 104. The bridging wire 116 strides over the first transparent patterned electrode 104 and electrically bridges the second transparent patterned electrodes 106 located at the two sides of the first transparent patterned electrode 104 to form a conducting wire 118. The transparent dielectric pad 108 is disposed between the bridging wire 116 and the first transparent patterned electrode 104. The projective capacitive touch sensor structure further optionally includes the first connecting wire 120 and the second connecting wire 122. Herein, the first connecting wire 120 connects the first transparent patterned electrode 104 and has the first electrically connected terminal 124. The second connecting wire 122 connects the second transparent patterned electrode 106 located at one end of the conducting wire 118. The second connecting wire 122 has the second electrically connected terminal 126. Herein, the materials, characteristics, formations and functions of various components in the projective capacitive touch sensor structure have been described in details in the exemplary embodiment aforementioned, and are thus omitted hereinafter.

Additionally, the projective capacitive touch sensor structure further includes a plurality of sensor units 100 (for example, referring to the content disclosed in the fabrication of the projective capacitive touch sensor structure of FIG. 1 in the above exemplary embodiment). In other words, the projective capacitive touch sensor structure falls within the protected scope of the disclosure as long as the projective capacitive touch sensor structure includes the substrate 102, at least one first transparent patterned electrode 104, at least two second transparent patterned electrode 106, at least one transparent dielectric pad 108, and at least one bridging wire 116.

According to the exemplary embodiments aforementioned, the dielectric portion 110 of the transparent dielectric pad 108 located above the first transparent patterned electrode 104 and the second transparent patterned electrodes 106 includes the upper surface 112, the lower surface 114, and the inclined side surface 113 connecting the upper surface 112 and the lower surface 114. The area A1 of the upper surface 112 is 70% to 95% of the area A2 of the lower surface 114. The included angle θ between the inclined side surface 113 and the lower surface 114 is an acute angle. Consequently, the generation of image sticking and bright dots is prevented in the visible region of the touch sensor, and a better image quality can be obtained. Herein, the height h of the dielectric portion 110 is lower than 30 μm, for example. A range of tolerance of the height deviation Δh of the upper surface 112 of the dielectric portion 110 is equal to or under 10% of the height h, for example.

Figure 3:
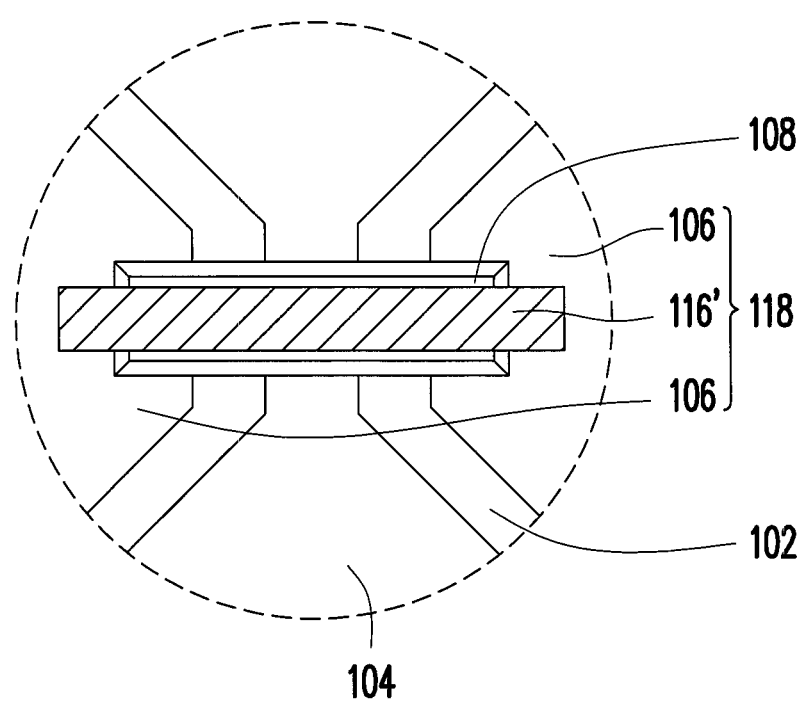
FIG. 3 is a schematic diagram illustrating a top view of an enlarged portion of FIG. 1 to another exemplary embodiment of the disclosure.

FIG. 3 is a schematic diagram illustrating a top view of an enlarged portion of FIG. 1 to another exemplary embodiment of the disclosure.

Referring to FIG. 1 and FIG. 3, a difference between the exemplary embodiments of FIG. 3 and FIG. 1 is that the materials of the bridging wire 116' in FIG. 3 and the bridging wire 116 in FIG. 1 are different. Furthermore, materials, characters, forming methods and functions of the other components in FIG. 3 are similar to that in the exemplary embodiment of FIG. 1, and descriptions thereof are not repeated.

In the exemplary embodiment of FIG. 3, a material of the bridging wire 116' includes, for example, a transparent conductive ink material including a metal oxide material, an organic transparent conductive material or an organic and inorganic mixed material. A method of forming the bridging wire 116' includes a gravure offset printing method, an ink jet printing method, a screen printing method or a transfer printing method, for example. Moreover, in the exemplary example of FIG. 1, a material of the bridging wire 116 includes, for example, a metal-containing material including a conductive silver paste, a copper-containing metal or a multiple layer material of molybdenum/aluminum/molybdenum (Mo/Al/Mo).

In the exemplary example of FIG. 1, when the material of the bridging wire 116 is, for example, the metal-containing material, it is preferable that a line width of the bridging wire 116 is designed to be less than visible width of human eyes, so as to improve the quality of the visible region of the projective capacitive touch sensor structure. However, when the material of the bridging wire 116' of FIG. 3 is, for example, the transparent conductive ink material, a line width of the bridging wire 116' is not restricted by the above-mentioned condition, even the line width of the bridging wire 116' can be equal to a width of the upper surface 112 of the transparent dielectric pad 108 as a result of the transparent conductive ink material having a material character of transparency.

In summary, the exemplary embodiments aforementioned include at least the following features:

The projective capacitive touch sensor structure introduced in the exemplary embodiments prevents the generation of image sticking or bright dots in the visible region of the touch sensor so as to improve the image quality.

The method of fabricating the projective capacitive touch sensor structure introduced in the exemplary embodiments can simplify the fabrication greatly so as to shorten the production time and increase production.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A projective capacitive touch sensor structure, comprising:
    a substrate;
    a first transparent patterned electrode disposed on the substrate;
    two second transparent patterned electrodes disposed on the substrate and located at two sides of the first transparent patterned electrode;
    a bridging wire striding over the first transparent patterned electrode and electrically bridging the second transparent patterned electrodes located at the two sides of the first transparent patterned electrode to form a conducting wire; and
    a transparent dielectric pad disposed between the bridging wire and the first transparent patterned electrode, wherein a dielectric portion of the transparent dielectric pad located above the first transparent patterned electrode and the second transparent patterned electrodes comprises an upper surface, a lower surface, and an inclined side surface connecting the upper surface and the lower surface, an area of the upper surface is 70% to 95% of an area of the lower surface, and an included angle between the inclined side surface and the lower surface is an acute angle.

2. The projective capacitive touch sensor structure as claimed in claim 1, wherein a height deviation of the upper surface of the dielectric portion is equal to or smaller than 10% of a height of the dielectric portion.

3. The projective capacitive touch sensor structure as claimed in claim 1, wherein a height of the dielectric portion is lower than 30 μm.

4. The projective capacitive touch sensor structure as claimed in claim 1, wherein the substrate comprises a flexible substrate or a rigid substrate.

5. The projective capacitive touch sensor structure as claimed in claim 4, wherein a material of the flexible substrate comprises polyethylene terephthalate, polycarbonate, or a flexible glass.

6. The projective capacitive touch sensor structure as claimed in claim 4, wherein the rigid substrate comprises a rigid glass.

7. The projective capacitive touch sensor structure as claimed in claim 1, wherein a material of the first transparent patterned electrode and the second transparent patterned electrode comprises a transparent conductive oxide, an organic transparent conductive material, a nano metal, or a carbon nanotube.

8. The projective capacitive touch sensor structure as claimed in claim 1, wherein a material of the bridging wire comprises a metal-containing material including a conductive silver paste, a copper-containing metal or a multiple layer material of molybdenum/aluminum/molybdenum.

9. The projective capacitive touch sensor structure as claimed in claim 1, wherein a material of the transparent dielectric pad comprises a photo-sensitive resin or a thermosetting resin.

10. The projective capacitive touch sensor structure as claimed in claim 1, wherein a light transmittance of the transparent dielectric pad is higher than 90%.

11. The projective capacitive touch sensor structure as claimed in claim 1, wherein a refractive coefficient of the transparent dielectric pad ranges from 1 to 2.

12. The projective capacitive touch sensor structure as claimed in claim 1, further comprising:
a first connecting wire connecting the first transparent patterned electrode and having a first electrically connected terminal; and
a second connecting wire connecting the second transparent patterned electrode located at one end of the conducting wire and the second connecting wire having a second electrically connected terminal.

13. The projective capacitive touch sensor structure as claimed in claim 12, wherein a material of the first connecting wire and the second connecting wire respectively comprises a metal-containing material including a conductive silver paste, a copper-containing metal or a multiple layer material of molybdenum/aluminum/molybdenum.

14. The projective capacitive touch sensor structure as claimed in claim 1, wherein a material of the bridging wire comprises a transparent conductive ink material including a metal oxide material, an organic transparent conductive material or an organic and inorganic mixed material.

15. A method of fabricating a projective capacitive touch sensor structure, the method comprising:
providing a substrate;
forming a first transparent patterned electrode and two second transparent patterned electrodes on the substrate, the second transparent patterned electrodes disposed at two sides of the first transparent patterned electrode;
printing a transparent dielectric pad on the first transparent patterned electrode and the second transparent patterned electrodes, wherein a dielectric portion of the transparent dielectric pad located above the first transparent patterned electrode and the second transparent patterned electrodes comprises an upper surface, a lower surface, and an inclined side surface connecting the upper surface and the lower surface, an area of the upper surface is 70% to 95% of an area of the lower surface, and an included angle between the inclined side surface and the lower surface is an acute angle; and
forming a bridging wire on the transparent dielectric pad, the bridging wire striding over the first transparent patterned electrode and electrically bridging the second transparent patterned electrodes located at the two sides of the first transparent patterned electrode to form a conducting wire.

16. The method of fabricating the projective capacitive touch sensor structure as claimed in claim 15, wherein a height deviation of the upper surface of the dielectric portion is equal to or smaller than 10% of a height of the dielectric portion.

17. The method of fabricating the projective capacitive touch sensor structure as claimed in claim 15, wherein a height of the dielectric portion is lower than 30 μm.

18. The method of fabricating the projective capacitive touch sensor structure as claimed in claim 15, wherein a method of forming the first transparent patterned electrode and the second transparent patterned electrodes respectively comprises performing a deposition process, a photolithography process and an etching process.

19. The method of fabricating the projective capacitive touch sensor structure as claimed in claim 15, wherein a method of printing the transparent dielectric pad comprises a screen printing method or a transfer printing method.

20. The method of fabricating the projective capacitive touch sensor structure as claimed in claim 15, wherein a material of the bridging wire comprises a metal-containing material including a conductive silver paste, a copper-containing metal or a multiple layer material of molybdenum/aluminum/molybdenum.

21. The method of fabricating the projective capacitive touch sensor structure as claimed in claim 20, wherein a method of forming the bridging wire comprises a gravure offset printing method, an ink jet printing method, or performing a deposition method, a photolithography method, and an etching method.

22. The method of fabricating the projective capacitive touch sensor structure as claimed in claim 15, wherein a material of the bridging wire comprises a transparent conductive ink material including a metal oxide material, an organic transparent conductive material or an organic and inorganic mixed material.

23. The method of fabricating the projective capacitive touch sensor structure as claimed in claim 22, wherein a method of forming the bridging wire comprises a gravure offset printing method, an ink jet printing method, a screen printing method or a transfer printing method.

24. The method of fabricating the projective capacitive touch sensor structure as claimed in claim 15, further comprising forming a first connecting wire and a second connecting wire on the substrate, wherein the first connecting wire is connected to the first transparent patterned electrode and has a first electrically connected terminal, and the second connecting wire is connected to the second transparent patterned electrode at one end of the conducting wire and has a second electrically connected terminal.

25. The method of fabricating the projective capacitive touch sensor structure as claimed in claim 24, wherein a method of forming the first connecting wire and the second connecting wire comprises a screen printing method, a transfer printing method, a gravure offset printing method, an ink jet printing method, or a photolithographic etching method.

26. The method of fabricating the projective capacitive touch sensor structure as claimed in claim 24, wherein a method of forming the transparent dielectric pad, the bridging wire, the first connecting wire, and the second connecting wire comprises a sheet-fed printing method or a roll-to-roll printing method.

* * * * *